United States Patent Office 2,768,963
Patented Oct. 30, 1956

2,768,963

HALOPHENYL-HYDROXY-PHENYL-ALKANONITRILES

Kurt J. Rorig, Evanston, Ill., assignor, by mesne assignments, to G. D. Searle & Co., Skokie, Ill., a corporation of Delaware No Drawing. Application November 25, 1953,
Serial No. 394,473

7 Claims. (Cl. 260—465)

The present invention relates to a new group of halogenated nitriles and, more particularly, to nuclearly halogenated derivatives of α,β-diphenylalkanonitriles. The compounds which constitute this invention can be represented by the general structural formula

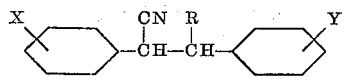

wherein one of the radicals X and Y is a halogen radical and the other is a member of the class consisting of hydroxy and lower alkoxy radicals, and wherein R is hydrogen or lower alkyl radicals.

In the foregoing structural formula one of the radicals X and Y represents a halogen radical such as fluorine, chlorine, bromine or iodine while the other is a hydroxy or a lower alkoxy radical such as methoxy, ethoxy, propoxy, butoxy and the like. The radical R can represent hydrogen or a lower alkyl radical such as methyl, ethyl, propyl, isopropyl, butyl and the like.

The compounds of my invention provide valuable therapeutic agents, particularly for the treatment of hypertensive conditions and syndromes associated with adrenocortical imbalance. They antagonize the hypertensive action of desoxycorticosterone. They are valuable intermediates in the organic synthesis of other medicinal agents. Thus, hydrogenation of the claimed nitriles in the presence of lithium aluminum hydride yields β,γ-diphenylalkanamines of the structural formula

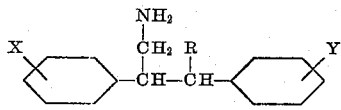

all symbols being defined as hereinabove. These amines provide useful hormonal agents in the form of their water soluble salts.

Alkaline hydrolysis of the claimed nitriles yields the amides of the formula

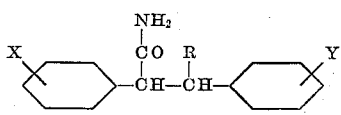

More vigorous hydrolysis yields the free acids.

Treatment of the claimed nitriles with Grignard reagents produces ketones. Thus reaction with methyl magnesium bromide yields alkanones of the type

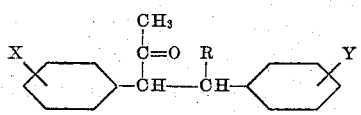

The following examples illustrate in detail some of the compounds which constitute this invention and methods for their preparation. However, this invention is not to be construed as limited thereby in spirit or in scope. In these examples temperatures are given uncorrected in degrees centigrade (° C.) and relative amounts of materials in parts by weight.

Example 1

To a solution of ethylmagnesium bromide, prepared from 24 parts of magnesium and 109 parts of ethyl bromide in 1050 parts of absolute ether, 156 parts of finely powdered α-(p-chlorophenyl)-p-methoxycinnamonitrile are added in the course of 10 minutes. After subsidence of the initial exothermic effect the reaction mixture is heated at reflux temperature with stirring for one hour. The initial greenish-yellow suspension changes to a dark brown solution. After being maintained at room temperature for 10 hours, the reaction mixture is added with stirring and cooling to a solution of 120 parts of concentrated hydrochloric acid in 230 parts of water. Stirring is continued for 2 hours at room temperature after which the ether layer is separated, dried over anhydrous potassium carbonate, filtered and concentrated under vacuum. Successive recrystallization of the residue from ether and ethanol yields α-(p-chlorophenyl)-β-(p-methoxyphenyl)valeronitrile melting at about 112–113.5° C. The infrared absorption spectrum shows maxima at 4.44, 7.9, 9.09 and 9.7 microns. The mother liquors from the ether recrystallization yield a brown oil, containing the lower melting stereoisomer.

Example 2

A mixture of 15 parts of α-(p-chlorophenyl)-β-(p-methoxyphenyl)valeronitrile and 47 parts of freshly distilled pyridine hydrochloride is heated at reflux temperature for 30 minutes and then poured into 300 parts of ice water. An oil forms which is separated and dissolved in 45 parts of hot nitromethane. On cooling, a precipitate forms which is collected on a filter, washed and dried. The α-(p-chlorophenyl)-β-(p-hydroxyphenyl)valeronitrile thus obtained melts at about 168–170° C. Upon recrystallization from benzene, white, lustrous fluffy needles are formed which melt at about 170.5–171.5° C. The compound has the structural formula

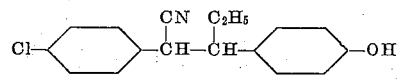

Example 3

A solution of 27 parts of α-(p-chlorophenyl)-p-methoxycinnamonitrile in 215 parts of acetone and 215 parts of butanone is hydrogenated in a Parr apparatus with shaking over 2 parts of a 5% palladium-on-carbon catalyst at room temperature and 43 to 40 lbs. pressure. After absorption of the theoretical amount of hydrogen, the catalyst is removed by filtration and the solvent is evaporated under a stream of nitrogen. The resulting residue is recrystallized from methanol to yield massive colorless blades which melt at about 115–116.5° C. The α-(p-chlorophenyl)-β-(p-methoxyphenyl)propionitrile thus obtained shows infrared maxima at about 4.45, 7.9, 9.1 and 9.7 microns.

Example 4

A mixture of 29 parts of α-(p-chlorophenyl)-β-(p-methoxyphenyl)propionitrile and 100 parts of pure pyridine hydrochloride is heated at reflux for 40 minutes and then poured into 600 parts of cold water. The infrared absorption spectrum of the α-(p-chlorophenyl)-β-(p-hydroxyphenyl)propionitrile thus obtained shows maxima at 2.92, 4.43, 7.94, 8.19, 9.11 and 9.82 microns.

Example 5

To a solution of ethylmagnesium bromide, prepared from 109 parts of ethyl bromide and 24 parts of magnesium in 1050 parts of absolute ether, are added 152 parts of finely powdered α-(p-methoxyphenyl)-p-chlorocinnamonitrile over a 10 minute period. The reaction mixture is stirred and heated at reflux temperature for 2 hours. During the first 10 minutes a tan crystalline precipitate separates from the green ether solution. The reaction mixture is cooled and treated by gradual addition of a solution of 120 parts of concentrated hydrochloric acid in 230 parts of water. The organic layer is separated. A small amount of oil insoluble in ether and in water is separated, which on hydrolysis with warm hydrochloric acid yields 1-(p-chlorophenyl)-2-(p-methoxyphenyl)-1-penten-3-one. The ether solution is dried over anhydrous potassium carbonate, filtered and evaporated. The dark residue is recrystallized from methanol. Washing of the resulting crystals with ice-cold methanol yields an essentially white powder melting at about 98–100° C. The infrared absorption spectrum of the α-(p-methoxyphenyl) - β - (p-chlorophenyl)valeronitrile thus obtained shows maxima at about 4.44, 7.92, 8.47, 9.11, 9.67 and 12.0 microns. The ultraviolet absorption spectrum shows a maximum at 228 millimicrons with a molecular extinction coefficient of 21,600.

*Example 6*

A mixture of 15 parts of α-(p-methoxyphenyl)-β-(p-chlorophenyl)valeronitrile and 55 parts of freshly distilled pyridine hydrochloride is heated at reflux temperature for 30 minutes and then poured into 300 parts of ice water with vigorous stirring. A white oil separates which solidifies almost immediately. The latter is collected on a filter, dried and recrystallized from hot nitromethane to yield crystals of α-(p-hydroxyphenyl)-β-(p-chlorophenyl)valeronitrile, melting at about 205–206° C.

I claim:
1. A nitrile of the structural formula

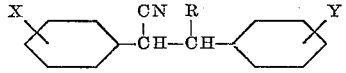

wherein one of the radicals X and Y is a halogen radical and the other is a hydroxy radical, and wherein R is a member of the class consisting of hydrogen and lower alkyl radicals.

2. A nitrile of the structural formula

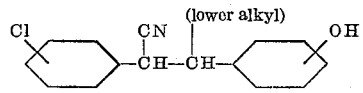

3. α-(p - Chlorophenyl)-β-(p-hydroxyphenyl)valeronitrile.

4. A nitrile of the structural formula

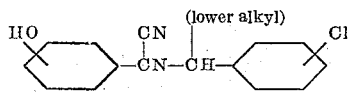

5. α-(p - Hydroxyphenyl)-β-(p-chlorophenyl)valeronitrile.

6. A nitrile of the structural formula

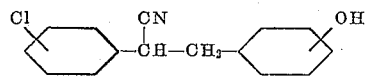

7. α-(p-Chlorophenyl)-β-(p - hydroxyphenyl)propionitrile.

References Cited in the file of this patent

Hunter et al.: J. A. C. S., vol. 70, pgs. 3424–6 (1948).
Dankova et al.: Chem. Abs., vol. 43, 2606–7 (1949).
Grummitt et al.: J. A. C. S. vol. 71, pgs. 4156–7 (1949).